United States Patent [19]

Wilkins

[11] Patent Number: 4,559,556
[45] Date of Patent: Dec. 17, 1985

[54] SYSTEM FOR VIEWING THREE DIMENSIONAL IMAGES

[76] Inventor: Vaughn D. Wilkins, 19163 Olympia St., Northridge, Calif. 91326

[21] Appl. No.: 681,932

[22] Filed: Dec. 14, 1984

Related U.S. Application Data

[63] Continuation-in-part of Ser. No. 550,137, Nov. 9, 1983, abandoned.

[51] Int. Cl.$^4$ ............................................. H04N 9/54
[52] U.S. Cl. ................................................... 358/88
[58] Field of Search .............................. 358/88, 92, 3

[56] References Cited

U.S. PATENT DOCUMENTS 3,050,870 8/1962 Heilig .................................... 358/88
4,151,549 4/1979 Bautze ................................... 358/89

Primary Examiner—Richard Murray
Attorney, Agent, or Firm—Pastoriza, Kelly & Lowry

[57] ABSTRACT

A viewing system is provided for viewing images with a three-dimensional effect, wherein the system is particularly adapted for viewing television images in full color. The viewing system comprises a filter mat having two juxtaposed polarizing filters for placement over a television viewing screen or other rear surface projection device in substantial registry with two similarly juxtaposed and slightly different images of a common scene or subject. The polarizing filters are oriented on different axes to polarize the light from the two images on different axes. The viewer observes these polarized images through eyeglasses having lens openings covered by polarizing lenses oriented with respect to the polarizing filters of the filter mat such that the two images are respectively observed by the viewer's right and left eyes. The eyeglass lens openings are further covered by movable image shifting lenses supported for simultaneous adjustment to merge the observed images into superimposed relation thereby providing a highly realistic three-dimensional effect. Magnification of the merged images is also provided in preferred forms of the invention.

22 Claims, 16 Drawing Figures

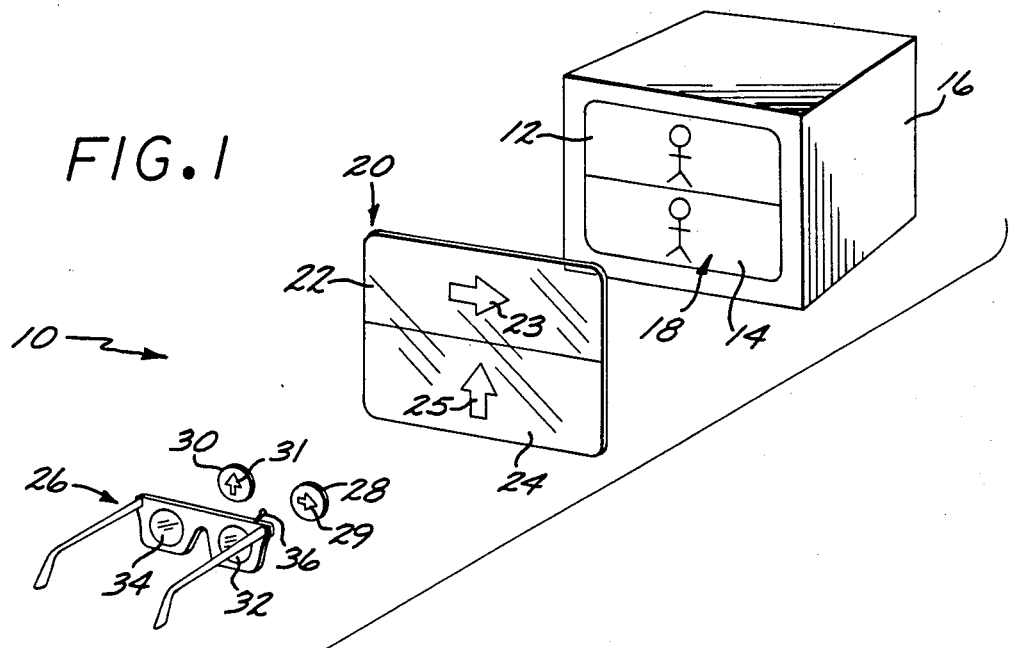
FIG. 1
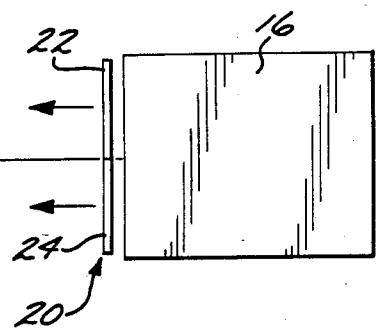
FIG. 2
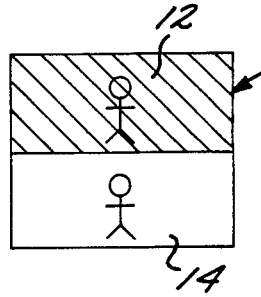
FIG. 3A
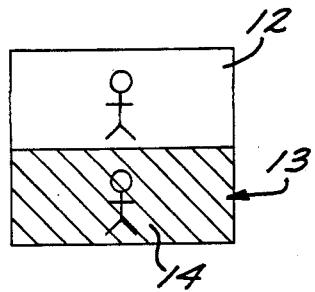
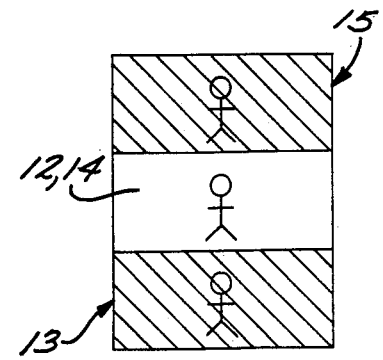
FIG. 3B

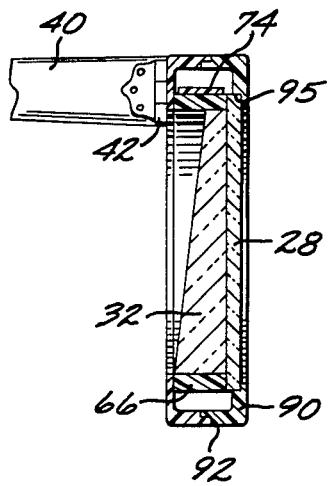
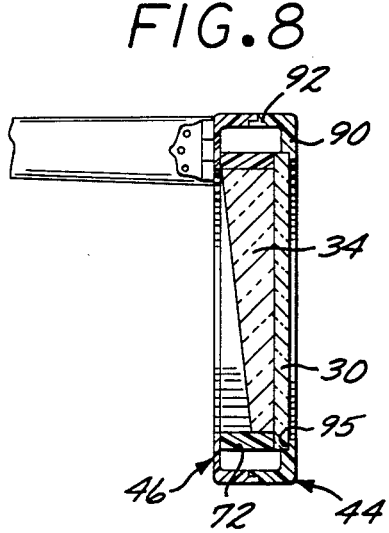
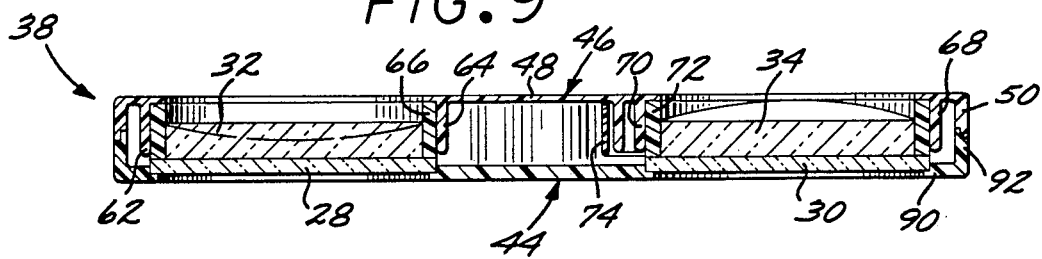
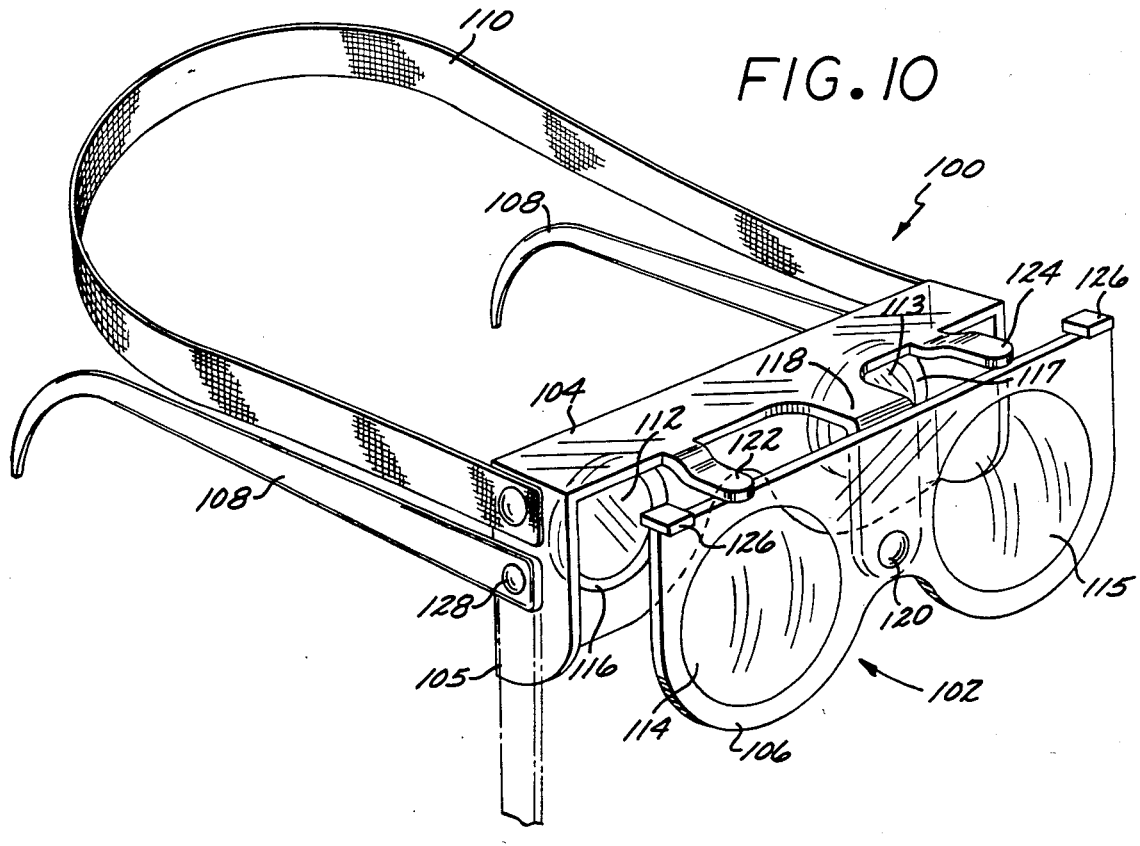

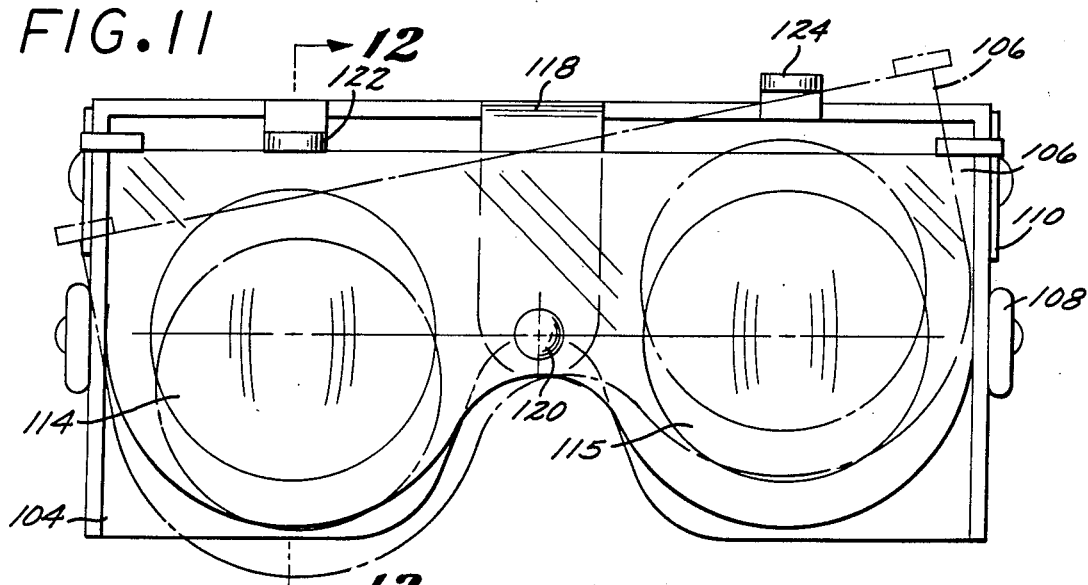
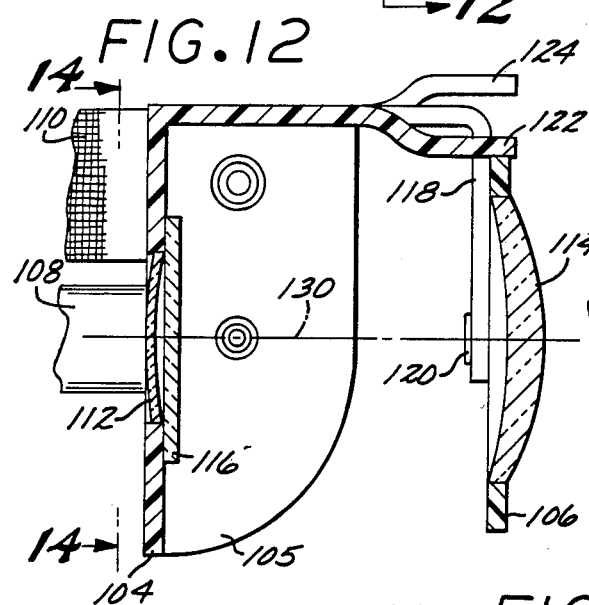
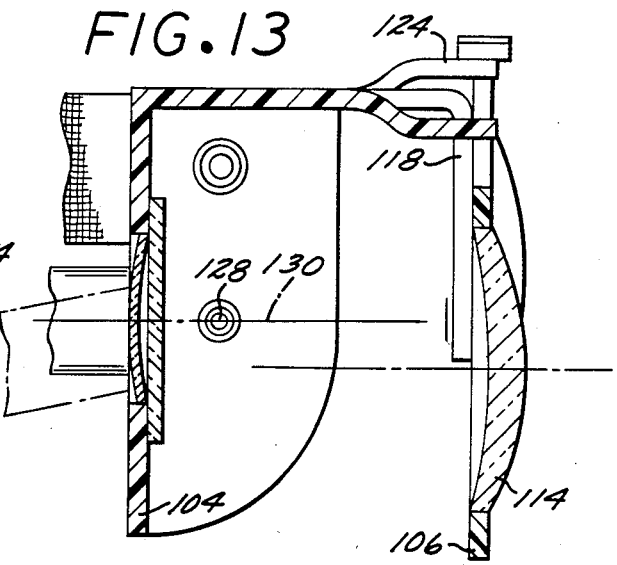
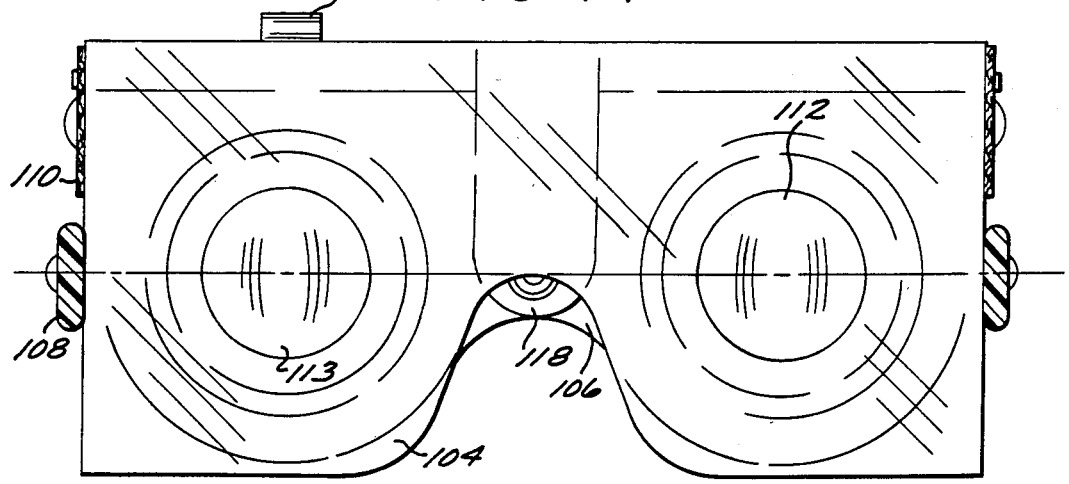

SYSTEM FOR VIEWING THREE DIMENSIONAL IMAGES

BACKGROUND OF THE INVENTION

This is a continuation-in-part of copending application Ser. No. 06/550,137, filed Nov. 9, 1983, now abandoned.

This invention relates generally to systems and system components for use in viewing two-dimensional images with a perceived three-dimensional effect. More specifically, this invention relates to an improved three-dimensional viewing system and components therefor particularly adapted for observing broadcast television images with a three-dimensional effect and in full color.

Three-dimensional imagery is a relatively well-known phenomenon wherein a two-dimensional image of a scene or subject appears to have a third dimension of depth. Such imagery has become popular in the motion picture and television industries and is normally achieved by simultaneously photographing a common scene or subject using two cameras mounted at slightly spaced positions. The two resultant and slightly different photographic images of the scene or subject are then displayed simultaneously typically in superimposed relation on a two-dimensional surface or screen for audience viewing. Each viewer is equipped with a pair of special eyeglasses having appropriate filter lenses for separating the superimposed images from one another, such that the viewer's right and left eyes respectively observe the different images and thereby perceive a realistic-appearing third dimension of depth. According to one common technique referred to as the anaglyphic process, the two images are color coded and the eyeglass lenses are provided in different colors, such as red and blue, to filter and separate the two images from one another. Alternatively, in accordance with another well-known technique referred to as the polarized process, light from the two images is polarized on different axes and the eyeglass lenses comprise polarizing filters for separating the two images.

In a motion picture theater, the polarized process is generally preferred for projecting and viewing motion picture productions with a three-dimensional effect, since light polarization does not alter the color of the projected images thereby permitting the production to be projected and observed in full color. More specifically, the motion picture production is typically projected onto a theater screen by use of two slightly spaced and synchronized projectors equipped with appropriately oriented polarizing filters. The two projectors thus project two slightly different images of each scene or subject in superimposed relation on the theater screen by use of differently polarized light. Each member of the audience is supplied with eyeglasses having appropriately oriented polarizing lenses for respectively blocking and passing opposite images to the viewer's right and left eyes. Importantly, this polarized filtration does not alter image color thereby permitting the audience to enjoy both three-dimensional and color effect of the motion picture production.

In recent years, it has become highly desirable to broadcast or prerecord on video tape a variety of motion picture productions and/or other programming in a manner permitting in-the-home television viewing with a three-dimensional effect. However, the polarized process cannot be used since, among other things, current television receiver technology does not permit different images to be displayed on a television picture screen with different light polarization. Accordingly, three-dimensional television programming has utilized the anaglyphic process wherein two slightly different and differently color-coded images of a scene or subject are superimposed on the picture screen of a color television receiver for audience viewing through eyeglasses having appropriate color-coded lenses. While this anaglyphic process will permit perception of the broadcast images with at least some three-dimensional appearance, particularly if the television color adjustment controls are carefully set, the perceived image inherently is not viewed with natural or full range color. Instead, the perceived image is entirely or predominantly black and white in appearance thereby preventing maximum audience enjoyment with many television productions.

There exists, therefore, a significant need for an improved three-dimensional viewing system which will permit viewing of broadcast television images with a three-dimensional effect and in full or natural color. The present invention fulfills this need and provides further related advantages.

SUMMARY OF THE INVENTION

In accordance with the invention, a viewing system and components therefor is provided for viewing television images and the like with a three-dimensional effect and in full color. The viewing system includes means for polarizing on different axes light from a pair of slightly different images of a common scene or subject displayed in juxtaposed relation on the viewing screen of a television or other rear surface projection apparatus. The differently polarized images are viewed through eyeglasses having polarizing lenses such that the viewer's eyes respectively see different images. The eyeglasses further include image shifting lenses movable to merge the observed images to a generally superimposed relationship thereby providing a highly realistic three-dimensional effect. Image magnification means are also provided in preferred forms of the invention.

In the preferred form of the invention, the two images of the common scene or subject are displayed on the television screen or the like in juxtaposed and preferably vertically separated relation. Light from these images is polarized on axes generally perpendicular to one another by a filter mat adapted for mounting over the viewing screen. This filter mat comprises a pair of juxtaposed transparent polarizing filters having a size and shape for general registry with the two images displayed on the viewing screen.

The juxtaposed images are observed by the viewer through the eyeglasses having lens openings covered by polarizing lenses fixed at different orientations for respectively blocking a different one of the images from passage through the associated lens opening. These polarizing lenses thus permit a different one of the images to pass through the two lens openings for respective observation by the viewer's right and left eyes.

The two observed images are merged by the viewer into a generally superimposed relation by movably adjusting the positions of the image shifting lenses which are also mounted over the two lens openings. When the images are merged into a single composite image, the viewer perceives a highly realistic and pleasing three-dimensional effect which may include full or natural color.

In accordance with one aspect of the invention, in one preferred form, the image shifting lenses comprise prismatic lenses carried by the eyeglasses for rotational movement about their respective central optical axes. These prismatic lenses are interconnected by adjustment means for simultaneous rotation in opposite directions in response to viewer displacement of a single control rod.

In accordance with an alternative preferred form of the invention, the image shifting lenses comprises pairs of magnification lenses spaced axially along the sightline and adapted for relatively low power image magnification. A movable frame member supports one lens of each pair for movement to a position misaligned axially relative to the other lens resulting in shifting of the observed images into superimposed, merged relation and image magnification.

In a still further alternative form of the invention, the above-described pairs of low power magnification lenses for image shifting can be combined with a respective pair of prismatic lenses fixedly supported on the eyeglasses in positions for partially shifting the observed images when the magnification lenses are axially aligned. Subsequent adjustment of the magnification lenses as described thus results in image merger, with the magnification lens adjustment being of lesser magnitude to maintain image sightlines more closely to the centers of the lenses for improved image clarity and quality. Adjustment of the magnification lenses in a direction away from image merger displaces the observed images toward a perceived nonshifted position to permit viewing of a conventional full screen two-dimensional television image with magnification.

The eyeglasses include further advantageous features, such as, for example, a lens-supporting front frame connected to bows which are adjustable to vary front frame tilt relative to the viewer's line of sight. Moreover, the bows can be pivoted if desired to an out-of-the way position permitting an elastic strap to retain the front frame upon the head of a viewer. The rear side of the front frame advantageously has a generally planar shape to fit snugly in strap-supported relation against prescription eyeglasses of a viewer.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is an exploded perspective view, shown somewhat in schematic form, illustrating the three-dimensional image viewing system of the present invention;

FIG. 2 is an exploded schematic view illustrating the viewing system generally in side elevation;

FIG. 3a is a diagrammatic illustration depicting images observed by the viewer's right and left eyes;

FIG. 3b is a diagrammatic illustration depicting merger of the observed images into a superimposed relation forming a single composite image;

FIG. 7 is a fragmented vertical section taken generally on the line 7—7 of FIG. 6;

FIG. 8 is a fragmented vertical section taken generally on the line 7—7 of FIG. 6;

FIG. 9 is a horizontal section taken generally on the line 9—9 of FIG. 6;

FIG. 10 is a perspective view illustrating an alternative form of eyeglasses for use with the viewing system;

FIG. 11 is an enlarged front elevation view of the eyeglasses shown in FIG. 10;

FIG. 12 is a fragmented vertical section taken generally on the line 12—12 of FIG. 11;

FIG. 13 is a fragmented vertical section similar to FIG. 12 but illustrating the eyeglasses in an alternative position of adjustment;

FIG. 14 is an enlarged rear elevation view of the eyeglasses shown in FIG. 10.

DETAILED DESCRIPTION OF THE PREFERRED EMBODIMENTS

Figure 4:
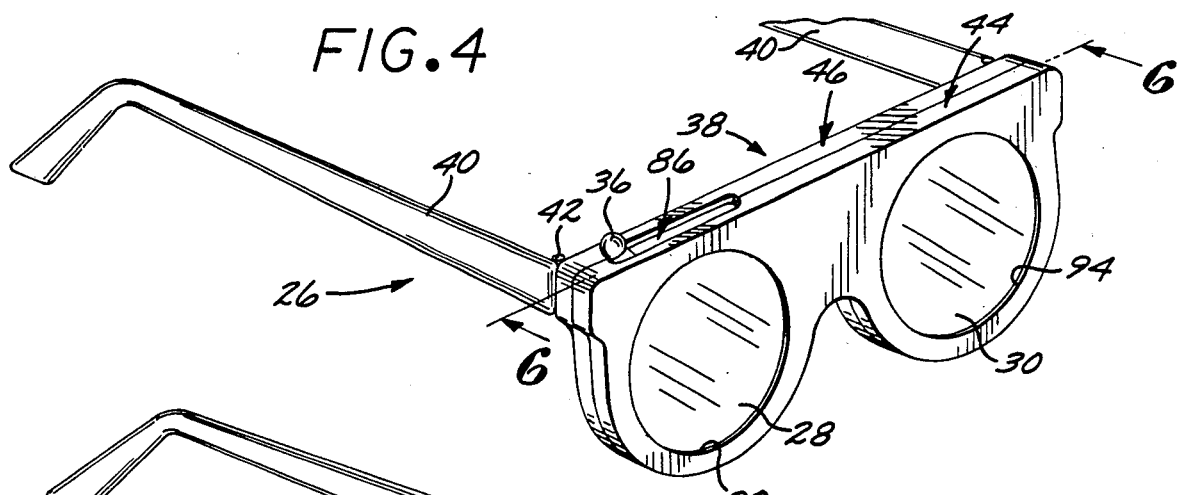
FIG. 4 is an enlarged fragmented perspective view illustrating eyeglasses for use with the viewing system.

As shown in the exemplary drawings, a viewing system referred to generally by the reference numeral 10 is provided for viewing a pair of slightly different two-dimensional images 12 and 14 of a common scene or subject as a single composite image including the appearance of a third dimension of depth. The viewing system 10 of the invention is particularly adapted to permit transmission of the two images 12 and 14 for reception and display by a conventional television 16, wherein these images can be viewed with three-dimensional effect in full or natural color.

The viewing system 10 of the present invention provides simple, inexpensive, and easy-to-use components for permitting full color three-dimensional viewing of television images. Such three-dimensional imagery in full color is made possible without requiring any fundamental change in conventional television transmission signals or videotaping techniques and further without requiring any change to a conventional television receiver.

As shown generally in FIGS. 1 and 2, the viewing system 10 requires display of the two images 12 and 14 in juxtaposed relation on the front picture screen 18 of a conventional television 16. These two images 12 and 14, as is well understood in the field of three-dimensional imagery, comprise two slightly different views of a common scene or subject typically taken by placement of two cameras at slightly spaced positions and generally at the same distance from the scene. In the preferred form of the invention, the two images 12 and 14 are positioned in vertically spaced relation such that the images occupy the entire width of the picture screen 18. Alternatively, if desired, the images 12 and 14 can be displayed in a side-by-side juxtaposed arrangement wherein the individual images are of lesser width but increased height. Moreover, while the invention described herein is with primary reference to television images, the viewing system 10 is equally applicable for use with other types of rear surface projection devices having a front viewing screen upon which images are displayed.

For viewing the two images 12 and 14 with a three-dimensional effect, observed light from the images is polarized on different axes by a transparent filter mat 20. This filter mat 20 comprises a sheet of transparent polarized plastic material or the like having a size and shape generally to cover the exposed surface area of the television picture screen 18. The mat 20 is mounted directly onto the television screen in any suitable manner or is otherwise positioned to overlie the screen in close proximity therewith. Importantly, the filter mat 20 comprises two juxtaposed polarizing filters 22 and 24 oriented on different, relatively perpendicular axes, as referenced by arrows 23 and 25 in FIG. 1. These polarizing filters 22 and 24 have a size and shape generally for registry with the displayed images 12 and 14, respectively, to polarize the image light on different axes.

The polarized images are observed by the viewer through eyeglasses 26 shown generally in FIG. 1. These eyeglasses include right and left lens openings for respective positioning in front of the viewer's right and left eyes (not shown). In addition, the eyeglasses 26 include multiple lens elements for controlling the observance of the polarized images such that the three-dimensional effect is perceived without distorting or altering the full or natural color of the images.

More particularly, the two lens openings of the eyeglasses 26 are respectively covered by transparent polarizing lenses 28 and 30. The polarizing lens 28 is supported in a fixed position oriented on an axis, referred to by arrow 29 in FIG. 1, corresponding with the axis of orientation of the upper polarizing filter 22 of the filter mat 20. The other polarizing lens 30, however, is oriented on a different axis as referred to by arrow 31 in FIG. 1, wherein this latter axis of orientation corresponds with the orientation of the lower mat filter 24. Magnification lenses for magnifying the observed images may also be provided, as will be described in more detail with respect to other forms of the eyeglasses.

With reference to FIG. 3a, the two polarizing lenses 28 and 30 function in use to separate the polarizing images 12 and 14 for respective and separate observance by the viewer's right and left eyes. That is, the polarizing lens 28 permits passage of the commonly polarized upper image 12 for observance by the viewer's right eye while filtering out or blocking passage of the lower image 14 having a different axis of polarization. This lower image 14 will appear as a black region, as indicated by arrow 13 in FIG. 3a. Conversely, the other polarizing lens 30 will permit passage of the lower and commonly polarized image 14 while filtering out or blocking passage of the differently polarized image 12. The viewer's left eye will therefore observe the lower image beneath a black region corresponding with the position of the upper image 12, as indicated by arrow 15 in FIG. 3a.

The eyeglasses 26 (FIG. 1) also include a pair of image shifting lenses 32 and 34 respectively covering the eyeglass lens openings. These image shifting lenses 32 and 34 are movably supported, as will be described in more detail, with respect to one form of the invention, in response to viewer adjustment of a control rod 36 for displacing the perceived positions of the observed images 12 and 14 to a generally superimposed relationship thereby forming a single composite image referred to by 12, 14 in FIG. 3b. This single composite image 12, 14 is observable by the viewer using the eyeglasses 26 with a highly pleasing three-dimensional and natural color effect with none of the system optical components altering the original color of the images 12 and 14. Conveniently, viewer enjoyment is further enhanced since the black filtered regions 13 and 15 bordering the vertical margins of the composite image substantially enhance the perceived contrast between the composite image and surrounding structure.

The eyeglasses 26 are shown in more detail in accordance with one preferred construction in FIGS. 4-9. As illustrated, the eyeglasses comprise a front frame assembly 38 carrying the polarizing lenses 28 and 30 as well as the image shifting lenses 32 and 34. Conventional bows 40 are secured by hinges 42 to the laterally opposite ends of the front frame assembly 38 to extend rearwardly therefrom for supported termination over the ears of a viewer, all in a well-known manner.

The front frame assembly 38 of the eyeglasses 26 is constructed from interfitting front and rear frame halves 44 and 46 which are formed from inexpensive and lightweight and preferably transparent materials, such as molded plastic and the like, with a configuration adapted for rapid assembly with the various lens components supported and sandwiched therebetween. More particularly, the rear frame half 46 is provided in the form of a forwardly open shell defined by a rear wall 48 bounded peripherally by a short, forwardly projecting flange 50. The rear wall 48 includes right and left lens openings 52 and 54 on opposite sides of a central nose bridge 60 of common shape.

The right lens opening 52 of the rear frame half 50 is bounded by laterally outer and inner arcuate support walls 62 and 54 each spaced slightly in a radially outward direction from the lens opening 52 and extending arcuately through an angle of about 90 degrees with respect to a central axis of the lens opening 52. These arcuate support walls 62 and 64 constrain and rotatably support a ring-shaped lens case 66 within which the associated image shifting lens 32 is supported, thereby permitting rotation of the image shifting lens 32 about the central axis of the lens opening 52 upon appropriate rotation of the case 66 within the support walls 62 and 64.

In a similar manner, a pair of laterally outer and inner arcuate support walls 68 and 70 project forwardly from the rear wall 48 of the rear frame half 46 in positions spaced slightly outwardly from the periphery of the second lens opening 54. This latter pair of arcuate support walls 68 and 70 constrain and rotationally support a ring-shaped lens case 72 which in turn carries the other image shifting lens 34. Accordingly, rotation of the lens case 72 within the support walls 68 and 70 correspondingly rotates the image shifting lens 34 about a central axis of the lens opening 54.

In the preferred form of the invention, the two image shifting lenses 32 and 34 respectively comprise prismatic lenses positioned relative to each other for shifting of the observed images 12 and 14 (FIG. 3a) into superimposed relation by rotation of the prismatic lenses in opposite directions with respect to each other. This rotational adjustment is carried out by relatively simple yet highly effective adjustment means including an elongated flexible adjustment band 74 connected between the lens cases 66 and 72 of the two image shifting lenses.

Figure 5:
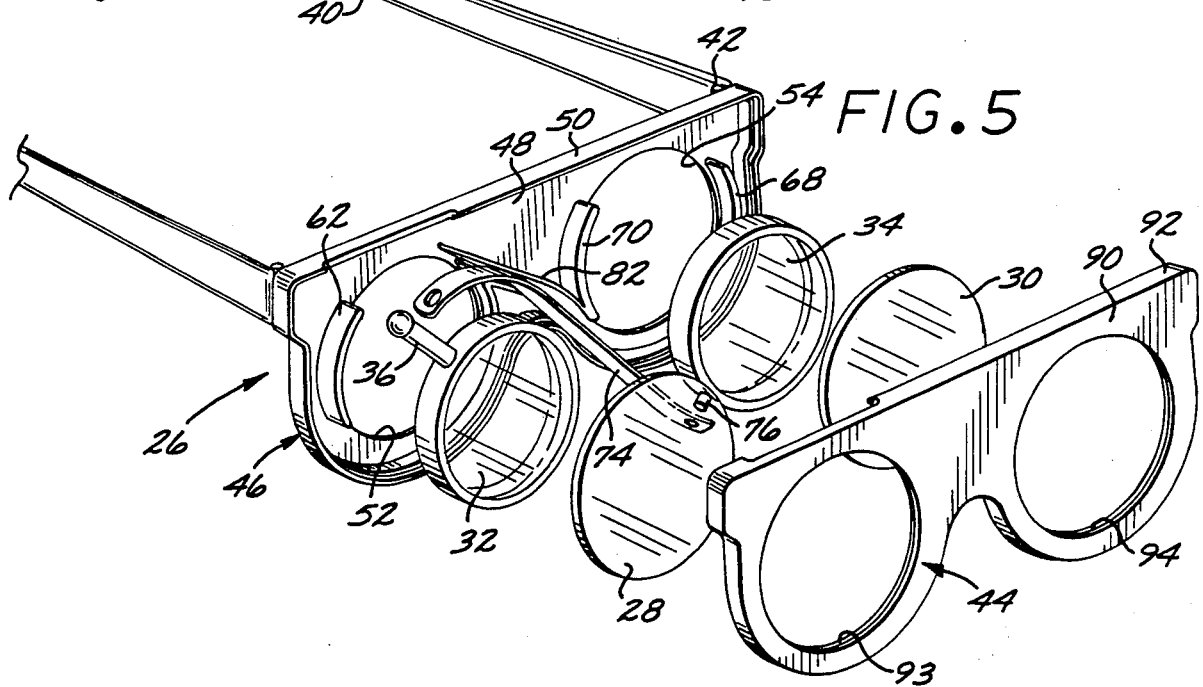
FIG. 5 is an exploded perspective view illustrating construction and assembly details of the eyeglasses.
Figure 6:
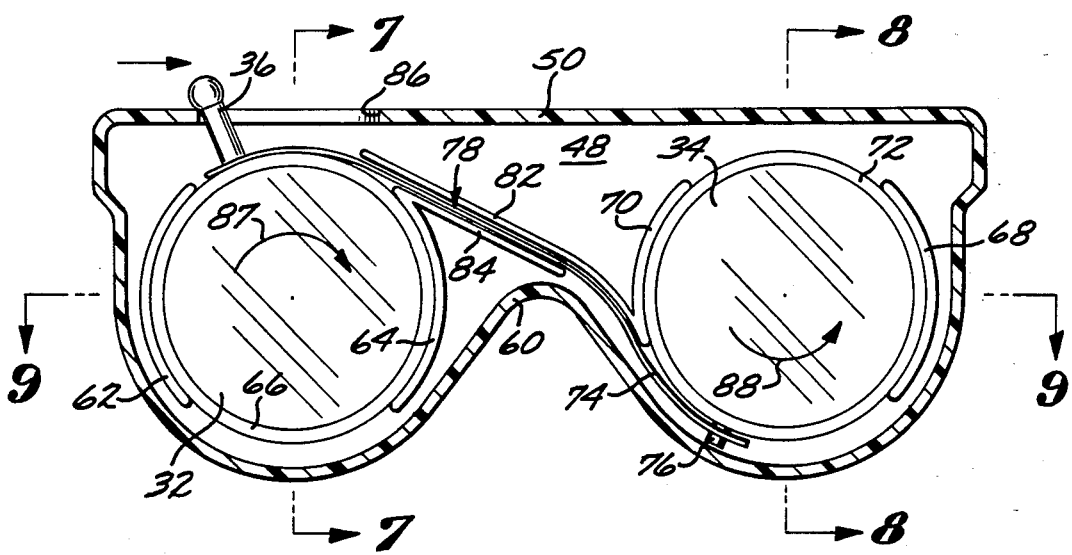
FIG. 6 is a transverse vertical section taken generally on the line 6—6 of FIG. 4.

More particularly, as shown in detail in FIGS. 5 and 6, the adjustment band 74 has one end secured by an anchor pin 76 to a lower region of the lens case 72 supporting the image shifting lens 34. From this anchor pin 76, the adjustment band extends in an upward and lateral direction through a narrow track 78 conveniently defined by the space between guide walls 82 and 84 extending angularly and laterally between and as extensions of the inner arcuate support walls 70 and 64, respectively. The adjustment band 74 exits this track 78 adjacent the upper end of the lens case 66 carrying the image shifting lens 32 whereat the band 74 is anchored to the case 66 by the control rod 36.

The control rod 36 projects from the lens case 66 upwardly through a laterally elongated slot 86 defined cooperatively by the front and rear frame halves 44 and 46 when assembled together. The upper end of the control rod 36 is accessible to the viewer for manual displacement back and forth within the limits of the slot 86 to rotate the two image shifting lenses 32 and 34 in opposite directions relative to each other, as indicated by way of example by arrows 87 and 88 in FIG. 6. Importantly, the control rod 36 directly rotates the image shifting lens 32 by longitudinal displacement of the adjustment band 74 within the track 78 to rotate the second lens case 72 by a push or pull action, as required. In this regard, the adjustment band 74 may be constructed from any suitable flexible material having sufficient longitudinal structural strength to provide the requisite push-pull action.

The front frame half 44 has a size and shape generally corresponding with the rear frame half 46 to fit over the rear frame half in assembled relation therewith. More particularly, as shown in FIGS. 5 and 7-9, the front frame half 44 has a front wall 90 bounded by a rearwardly extending peripheral flange 92. A pair of lens openings 93 and 94 is provided in the front frame half wherein each lens opening is bordered at the rear side thereof by a shallow counterbore 95. The polarizing lenses 28 and 30 are respectively seated within these counterbores 95 to cover the lens openings 93 and 94, with an appropriate adhesive material being provided if desired to lock the polarizing lenses 28 and 30 against rotation within the lens openings.

The front frame half 44 is assembled with the rear frame half 46 by aligned interfitting and interlocking relation between the flanges 92 and 50 of the frame halves. This interlocking relationship may be achieved by use of a suitable adhesive or the like or by use of interfitting snap-lock components (not shown) or by any other suitable interlocking structures. When assembled, however, the lens cases 66 and 72 of the image shifting lenses 32 and 34 bear snugly yet slidably against the rear peripheral margins of the polarizing lenses 28 and 30 to provide a sturdy frame assembly permitting rotation of the image shifting lenses without rotating the polarizing lenses.

In an alternative preferred form of the invention as shown in FIGS. 10-14, a pair of eyeglasses 100 are provided for use in the viewing system depicted in FIGS. 1-3. These eyeglasses 100 include a front frame assembly 102 formed preferably from a transparent material, such as molded plastic, to include a rear frame mmeber 104 having right and left lens openings aligned generally with a movable front frame member 106 also having right and left lens openings. A pair of conventional bows 108 extend rearwardly from the frame member 104 and an elastic strap 110 is also desirably provided for alternative use in retaining the eyeglasses on the head of a viewer, as will be described.

The lens openings of the rear and front frame members 104 and 106 respectively support combination image shifting and image magnification lenses for shifting the images into merged relation as viewed in FIGS. 3a and 3b while also magnifying the merged images to a size approximating the overall area of the television screen 18 (FIG. 1) or larger. More particularly, the rear frame member 104 supports a pair of meniscus lenses 112 and 113 of minus focal length in generally axially aligned, spaced relation with a pair of meniscus lenses 114 and 115 of plus focal length supported by the front frame member 106. The aligned pairs of lenses 112, 114, and 113, 115 are optically designed and matched to provide effective low power binoculars having low power magnification on the order of about 2-3 times magnification. When the eyeglasses 100 are worn by a person viewing the images 12 and 14 in FIG. 1, the images are thus magnified to appear larger. Importantly, with the desired low power magnification, the depth of field is ample to permit sufficiently clear viewing of the images within normal viewing ranges encountered in a home environment.

The images 12 and 14 are separately viewed by the viewer's right and left eyes by further covering the lens openings of the rear frame member 104 respectively with polarizing lenses 116 and 117, wherein these lenses 116 and 117 are differently oriented in the manner described with respect to the polarizing lenses 28 and 30 (FIG. 1). The viewer thus perceives the two images 12 and 14 in the manner depicted in FIG. 3a when the pairs of lenses 112, 114 and 113, 115 are coaxially aligned as shown in FIG. 10 and in solid lines in FIG. 11.

The front frame member 106 is movable relative to the rear frame member 104 to shift the observed images into merged or superimposed relation, as viewed in FIG. 3b, to obtain the desired full color three-dimensional effect. As shown in the illustrative embodiment, this movement is obtained by pivotally suspending the front frame member 106 from a support arm 118 on the rear frame member 104 to permit rotation of the front lenses 114 and 115 about the horizontal axis of a centered pivot pin 120. This permits displacement simultaneously of the lens 114 in a downward direction relative to its associated lens 112 and the other front lens 115 in an upward direction relative to its associated lens 113. Such upward/downward displacement of the lenses 114 and 115 is accompanied by an opposite or downward/upward perceived shift of the images 12 and 14 to the merged relation depicted in FIG. 3b. A first stop 122 conveniently projects forwardly from the rear frame member 104 to contact the front frame member 106 above the right front lens 114 when the lens pairs 112, 114 and 113, 115 are coaxially aligned without image shifting and a second stop 124 projects forwardly from the rear frame member 104 to contact the front frame member above the left front lens 115 when said front frame member is rotated to a position of maximum image shift. Finger tabs 126 on the front frame member are engageable by the viewer's finger (not shown) for facilitated adjustment purposes.

The eyeglasses 100 thus provide the desired image shifting capability while further providing image magnification. This permits image enlargement as observed with three-dimensional effect substantially the size or larger than the television screen 18. Moreover, for viewing conventional single-image two-dimensional nonpolarized television images, the eyeglasses 100 can be worn with the front frame member 106 adjusted for zero image shift thereby taking advantage of the magnification capability. Still further, by coupling the bows 108 to the rear frame member 104 by pivot pins 128 along side plates 105 and in a vertical plane 130 (FIGS. 12 and 13) coinciding with the sightline centers of the lenses 112 and 113, the frame assembly 102 can be tilted relative to the bows as shown in dotted lines in FIG. 13 to tilt the sightline as desired by the viewer. Alternatively, the bows 108 can be shifted downwardly, as viewed in dotted lines in FIG. 10, to an out-of-the-way position permitting use of the strap 110 to hold the front frame assembly 102 on the viewer's head, thereby advantageously permitting a rear substantially planar surface of the rear frame member 104 to fit substantially flush against the viewer's prescription eyeglasses (not shown).

Figure 15:
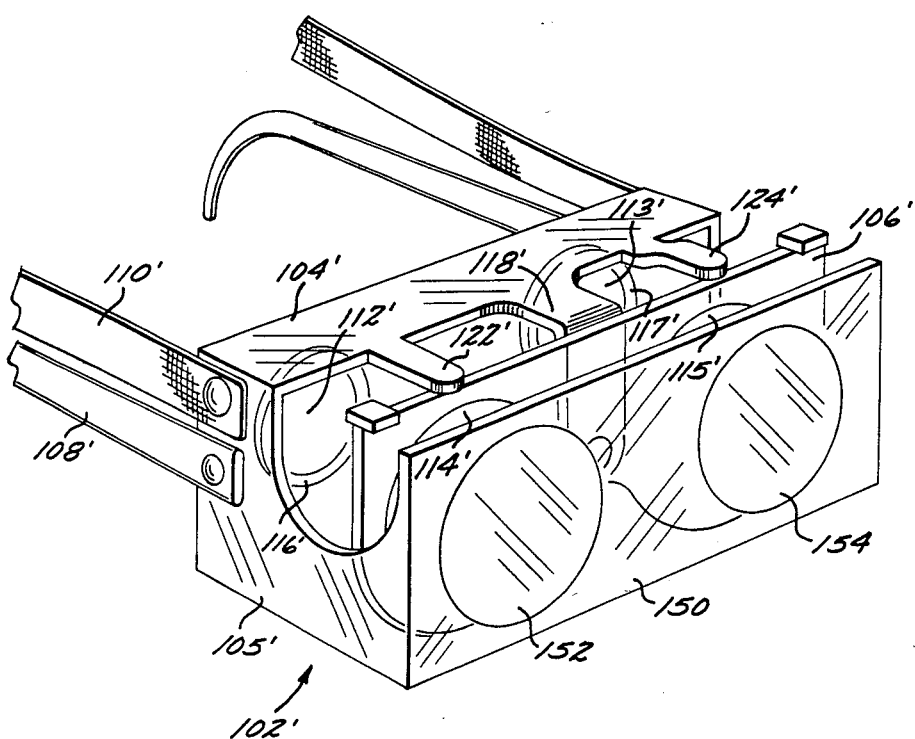
FIG. 15 is a perspective view illustrating a further alternative form of eyeglasses for use with the viewing system.

A further alternative form of the invention is depicted in FIG. 15 wherein components corresponding functionally with those shown and described in FIGS. 1-14 are referred to by common, primed reference numerals. In this embodiment, a front frame assembly 102' includes the rear and front frame members 104' and 106', with the front frame member 106' being movably supported by an arm 118' for adjusting the position of front magnification lenses 114' and 115' relative to rear magnification lens 112' and 113' for image shifting purposes. Bows 108' and/or strap 110' are provided to support the eyeglasses on the head of a viewer, and polarizing lenses 116' and 117' are provided for separate viewing of images 12 and 14 (FIG. 3a) by the viewer's eyes.

The rear frame member 104' includes side plate extensions 105' projecting forwardly beyond the front frame member 106' and joined or otherwise attached to an auxiliary frame member 150. This auxiliary frame member 150 has lens openings generally aligned with the magnification lens pairs 112', 114' and 113', 115' and covered by relatively low power prismatic lenses 152 and 154 generally of the type shown and described in FIGS. 7-9. However, these prismatic lenses are fixed in position and preset to provide a partial image shift on the order of 30-50 percent of the total image shift required for image merger, as viewed in FIG. 3b. Thus, when the magnification lens pairs 112', 114' and 113', 115' coaxially are aligned, the observed images 12 and 14 (FIG. 3a) are partially shifted toward merged relation thereby requiring a smaller total displacement of the front magnification lens 114' and 115' to shift the images 12 and 14 to merged relation. As a result, merger of the images can be achieved while maintaining the images more closely within the optical centers of all of the lenses for significantly improved image clarity and quality. The front frame member 106' can therefore be rotated to contact a stop 124' for optimum image shift toward merger and in an opposite direction past coaxial lens alignment to contact a stop 122' for zero image shift.

The viewing system 10 of the present invention thus provides a practical and economical system for viewing broadcast television programs with a highly pleasing three-dimensional effect and in full or natural color. The viewing system utilizes a relatively small number of components which are simple in form and inexpensive in manufacture. Moreover, in the preferred form, the viewing system utilizes a relatively simple yet easily adjusted eyeglass construction for easily and rapidly merging observed images into a single composite image for three-dimensional viewing.

A variety of further modifications and improvements to the viewing system and system eyeglasses described herein are believed to be apparent to one skilled in the art. For example, fixedly supported magnification lenses can be incorporated into the eyeglasses 26 of FIG. 1 having image shift capability due to rotation of the prismatic lenses. Accordingly, no limitation on the invention is intended, except by way of the appended claims.

What is claimed is:

1. A viewing system for viewing images displayed in two dimensions on a viewing screen with a three-dimensional effect, comprising:
   a pair of polarizing filters disposed between the viewing screen and a viewer for polarizing on different axes light from a respective pair of slightly different images of a common subject displayed on the viewing screen; and
   a pair of eyeglasses having a pair of lens openings for respective placement in front of the right and left eyes of the viewer, a pair of polarizing lenses respectively covering the lens openings and oriented generally upon axes conforming respectively with said polarizing filters whereby the viewer's right and left eyes will observe different ones of the pair of images, image shifting and magnification lens means respectively covering the lens openings, and means for adjusting said image shifting lens means for displacing the observed images into a viewer-perceived superimposed relation forming a composite image having a three-dimensional appearance.

2. The viewing system of claim 1 wherein the pair of images is displayed on the viewing screen in juxtaposed relation.

3. The viewing system of claim 2 wherein the viewing screen is a television picture screen.

4. The viewing system of claim 2 wherein the viewing screen comprises the front screen of a rear surface projection device.

5. The viewing system of claim 2 wherein the pair of images is displayed on the viewing screen in vertically spaced relation.

6. The viewing system of claim 1 wherein said pair of polarizing filters comprises a filter mat for placement as an overlay upon the viewing screen.

7. The viewing system of claim 1 wherein said image shifting lens means comprises a pair of prismatic lenses supported over the lens openings for rotation generally about the respective central axis of the lens openings, said adjustment means comprising means for rotating said prismatic lenses simultaneously in generally equal increments and in opposite rotational directions.

8. The viewing system of claim 1 wherein said eyeglasses include a front frame assembly having interfitting front and rear frame halves each having a pair of lens openings formed therein, said polarizing lenses being mounted nonrotationally over the lens openings of one of said frame halves and said image shifting lens means being movably mounted over the lens openings of the other of said frame halves.

9. The viewing system of claim 1 wherein the polarizing filters are oriented generally on axes perpendicular to each other.

10. The viewing system of claim 1 wherein said image shifting lens means comprises two pairs of magnification lenses respectively covering the lens openings, said pair of magnification lenses having one adjustable lens and said adjusting means including means for adjusting said adjustable lenses together.

11. The viewing system of claim 10 wherein said image shifting lens means further includes a pair of prismatic lenses respectively covering the lens openings.

12. A viewing system for viewing images displayed in juxtaposed relation on a television viewing screen with a three-dimensional effect, comprising:
   a filter mat for placement over the television screen, said mat having a pair of transparent polarizing filters in generally juxtaposed relation for general registry with the images on the screen and being oriented for polarizing light from the two images on different axes; and
   a pair of eyeglasses having a pair of lens openings for respective placement in front of the right and left eyes of a viewer, a pair of polarizing lenses respectively covering the lens openings and oriented generally upon axes conforming respectively with said polarizing filters whereby the viewer's right and left eyes will observe different ones of the pair of images, image shifting lens and magnification lens means respectively covering the lens openings, and means for adjusting said image shifting lens means for displacing the observed images into a viewer-perceived superimposed relation forming a composite image having a three-dimensional appearance.

13. A pair of eyeglasses for viewing two-dimensional images with a three-dimensional effect, comprising:
   a front frame half having a front wall with a pair of laterally spaced lens openings formed therein and a generally peripheral flange projecting rearwardly from said front wall;
   a rear frame half having a rear wall with a pair of lens openings formed therein with a lateral spacing generally corresponding with the lateral spacing between the lens openings of said front frame half, and a generally peripheral flange projecting forwardly from said rear wall;
   a pair of polarizing lenses secured against rotation in positions respectively covering the lens openings of said front frame half, said polarizing lenses being oriented for polarizing light passing therethrough on different axes;
   a pair of prismatic lenses each supported within a respective, generally ring-shaped lens case;
   wall means projecting forwardly from said rear wall of said rear frame half defining a pair of arcuate support walls bounding each of said rear frame half lens openings in slightly radially spaced relation thereto, said lens cases carrying said prismatic lenses being respectively rotatably supported within said pairs of support walls, said wall means further defining a relatively narrow track extending generally between a lower region of one of said rear frame half lens openings and an upper region of the other of said rear frame half lens openings;
   a longitudinally stiff adjustment band extending through said track and having opposite ends secured to said lens cases; and
   a control rod secured to one of said lens cases and extending outwardly therefrom through a slot defined cooperatively by said front and rear frame halves, said control rod being manually movable to rotate said prismatic lenses simultaneously in opposite rotational directions.

14. A pair of eyeglasses for viewing two-dimensional images with a three-dimensional effect, comprising:
   a frame assembly including a rear frame member and a front frame member movably supported on said rear frame member, said frame members each having a pair of lens openings formed therein, and means for retaining said frame assembly on the head of a viewer;
   a pair of polarizing lenses respectively covering the lens openings of said rear frame member, said polarizing lenses being oriented for polarizing light passing therethrough on different axes; and
   a pair of rear magnification lenses respectively covering the lens openings of said rear frame member and a pair of front magnification lenses respectively covering the lens openings of said front frame member, said front and rear magnification lenses cooperating with each other for magnifying images observed by the viewer therethrough;
   said front frame member being movable relative to said rear frame member to displace said front magnification lenses relative to said rear magnification lenses to shift images viewed therethrough by the viewer.

15. The eyeglasses of claim 14 further including stop means for limiting movement of said front frame member between a first position of substantially no observed image shift and a second position of maximum image shift.

16. The eyeglasses of claim 14 wherein said retaining means comprises bows for fitting over the ears of the viewer, said bows being mounted on said frame assembly for selective tilting of said frame assembly relative to said bows and for selective movement of said bows to an out-of-the-way position.

17. The eyeglasses of claim 16 wherein said retaining means further includes a strap.

18. The eyeglasses of claim 14 further including prismatic lenses generally aligned respectively with said first magnification lenses for shifting the images observed by the viewer.

19. The eyeglasses of claim 18 wherein said prismatic lenses are fixedly supported.

20. The eyeglasses of claim 14 wherein said front and rear frame members are formed from a transparent material.

21. The eyeglasses of claim 14 wherein said rear frame member has a substantially planar rear surface.

22. A pair of eyeglasses for viewing two-dimensional images with a three-dimensional effect, comprising:
   a frame assembly having a pair of lens openings;
   polarizing means for polarizing light images passing through the lens opening on different axes;
   means for shifting the perceived position of the images observed through the lens openings; and
   means for magnifying the images passing through the lens openings.

* * * * *